Figure 3:
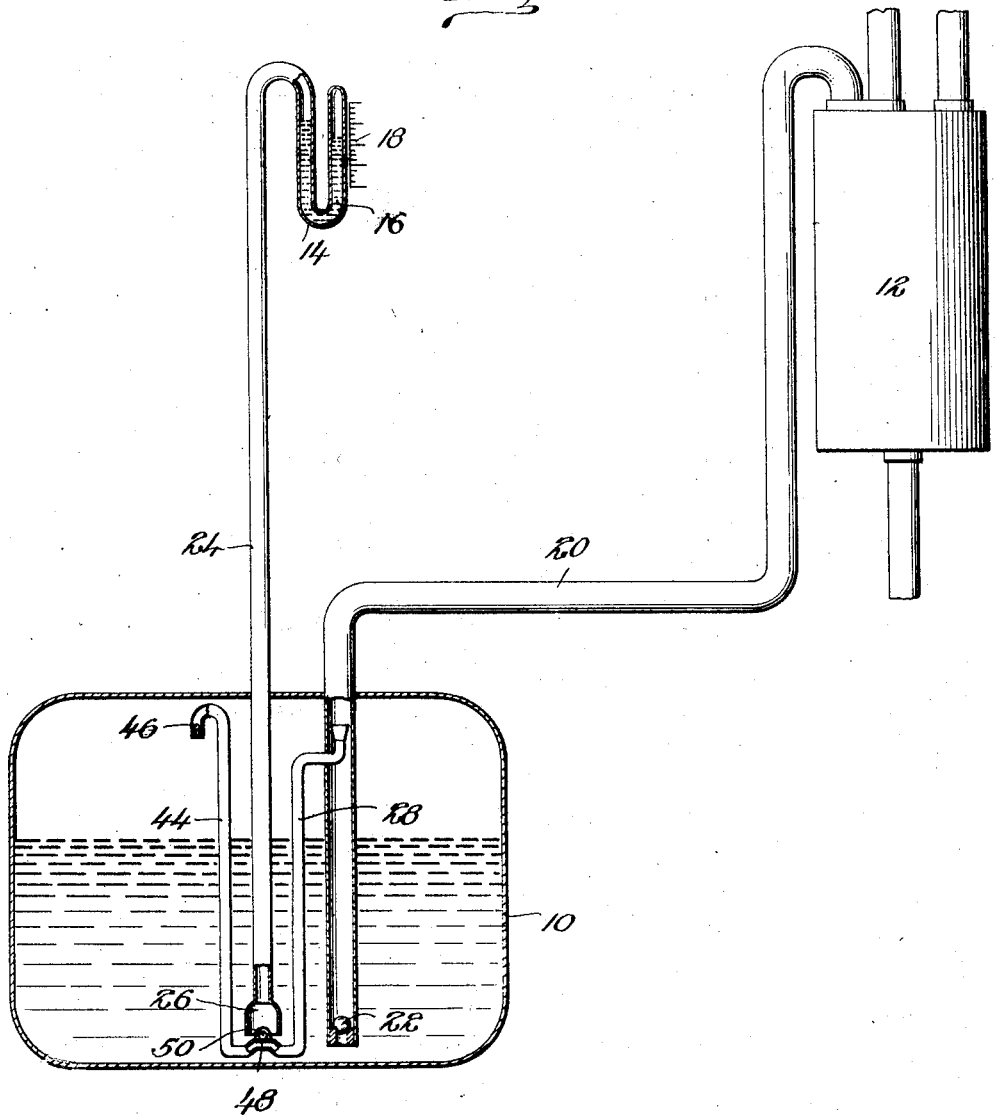

March 29, 1927.  1,622,503
J. FENTRESS
LIQUID LEVEL GAUGE
Filed April 6, 1925   2 Sheets-Sheet 1
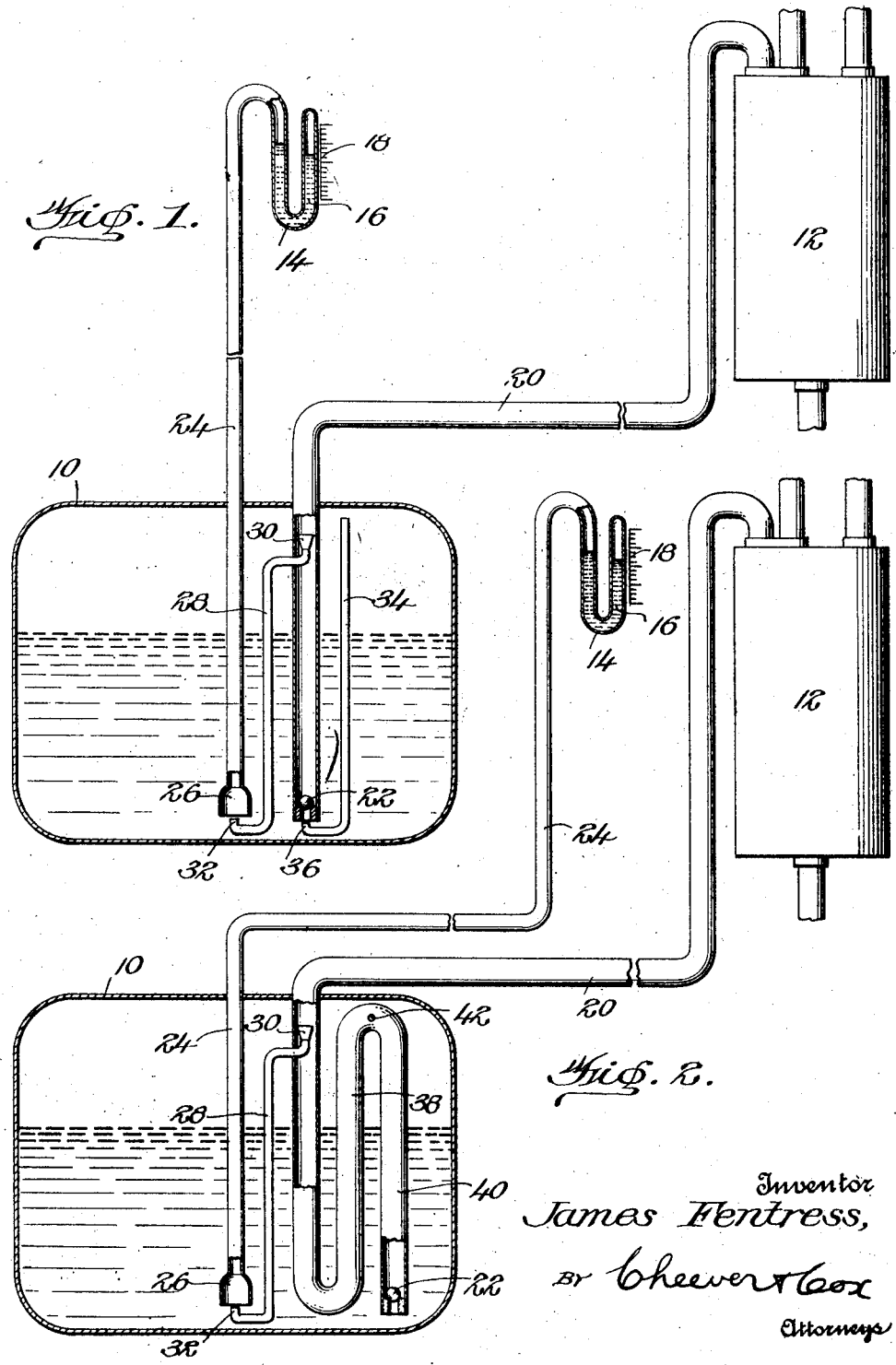

March 29, 1927.

J. FENTRESS 1,622,503

LIQUID LEVEL GAUGE

Filed April 6, 1925

2 Sheets-Sheet 2

Inventor
James Fentress,
By Cheever + Cox
Attorneys

Patented Mar. 29, 1927.

1,622,503

UNITED STATES PATENT OFFICE.

JAMES FENTRESS, OF CHICAGO, ILLINOIS.

LIQUID-LEVEL GAUGE.

Application filed April 6, 1925. Serial No. 21,102.

My invention relates to an improved device operating on the hydrostatic principle to indicate the amount of liquid within a receptacle, the same being particularly intended to indicate the amount of gasoline within the fuel supply tank of an automobile equipped with a vacuum feed system of withdrawing gasoline from said tank, and my purpose is to provide, in a device of this kind, means to stabilize the liquid indicating medium thereof and to correct errors therein due to barometric changes and to various other adverse conditions under which the device may operate.

With the foregoing and other purposes in view, my invention consists in the novel features of construction, combination and arrangement of parts as will be hereinafter more fully described, illustrated in the accompanying drawings and defined in the appended claims.

In the drawings:

Fig. 1 is a diagrammatic, sectional view illustrating a preferred form of my invention; and Fig. 2, a view similar to Fig. 1 illustrating an alternative form of my invention; and Fig. 3, a view similar to Fig. 1 showing another alternative form of my invention.

Referring particularly to Fig. 1 of the drawings, 10 designates a gasoline supply tank, 12 a vacuum tank, and 14 a U-tube gauge containing a quantity of indicating liquid 16 co-operating with suitable calibrations 18 on or adjacent to said tube.

Vacuum tank 12 is connected with supply tank 10 as is usual by a conduit 20 which conduit extends downwardly through the supply tank and terminates adjacent to the bottom thereof where it is provided for purposes of this invention with a check valve 22 opening in the direction of the vacuum tank. U-tube gauge 14 likewise is connected with the supply tank by a conduit 24 which also terminates adjacent to the bottom of said tank where it is provided, preferably, with an enlarged or bell end 26.

A tube 28 enters conduit 20 above check valve 22 and has its upper, open end 30 disposed within said conduit, from whence it leads downwardly outside of said conduit and terminates at its lower open end in an upward extension 32 disposed beneath the enlarged or bell end 26 of conduit 24.

Another tube 34 is suitably supported with its upper open end near the top of tank 10 and with an upward extension 36 at its lower open end disposed beneath the lower open end of conduit 20.

Vacuum tank 12 may be of any standard or preferred construction and operates in a well known manner to periodically draw gasoline through conduit 20 from the supply tank, and at intervals to automatically cut itself off from said conduit, allowing gasoline drawn into conduit 20 to flow by gravity back into the supply tank.

As vacuum tank 12 operates to draw gasoline through the conduit 20 from the supply tank, check valve 22 is unseated and the major amount of the gasoline drawn into said conduit enters through the lower open end of the latter, which gasoline is aerated because of a certain amount of air drawn with it into the conduit through tube 34. A minor amount of gasoline may be drawn into said conduit through tube 28.

When vacuum tank 12 automatically cuts itself off from conduit 20 and suction within said conduit ceases, check 22 closes and the aerated gasoline previously drawn into the conduit flows back to the supply tank through tube 28, discharging air bubbles beneath bell 26, which air bubbles rise into the conduit 24 and thus serve to correct any errors in the hydrostatic balance between the body of gasoline in the supply tank and the column of indicating liquid in the U-tube, and to stabilize the liquid in said U-tube, since any tendency of said liquid to fluctuate due to varying pressures, temperatures, etc., is rectified during each periodic operation of the vacuum tank.

In the alternative form of my invention shown in Fig. 2 of the drawing, tank 10, U-tube gauge 14, conduit 24 and tube 28 have the same arrangement as in the preferred form of my device shown in Fig. 1. In my alternative form, however, I dispense with tube 34 and form the conduit 20 with a double U-bend 38—40, that is, I extend said conduit upward from adjacent to the bottom of tank 10 as at 38 to a point near the top of said tank and then extend it downward as at 40 and terminate it near the bottom of the tank where it is provided with a check valve 22 as in the preferred form. At the junction of parts 38—40, near the top of the tank, I provide said conduit with an air entrance aperture 42. In this form of my invention gasoline drawn into the conduit 20 is aerated by reason of air drawn through aperture 42, and when suction in said conduit ceases the aerated gasoline is discharged through tube 28 beneath the bell end of conduit 24, releasing air bubbles which rise into said conduit and serve to correct any errors in the hydrostatic balance between the body of gasoline in the tank and the column of liquid in the U-tube gauge as aforementioned. During the return flow of the gasoline through the conduit 20 gasoline in extension 38 is forced upward and thereby acts as a weight tending to force the gasoline within the conduit 20 through tube 28.

In the alternative form of my invention shown in Fig. 3, tank 10, U-tube gauge 14, and conduits 20, 24 have the same arrangement as in Fig. 1. Tube 34 is dispensed with, however, as in the form of my invention shown in Fig. 2, and tube 28, instead of being terminated at its lower end in an upward extension disposed beneath the bell end 26 of conduit 24, as in Figs. 1 and 2, is extended under and across the bell 26 and then carried upwardly as at 44 to a point adjacent to the top of tank 10 where it is terminated in a downward extension carrying an inwardly opening check valve 46. Directly beneath bell 26 said tube 28 is provided with a port 48 controlled by a check valve 50 which latter is arranged to permit liquid to flow from said tube into the tank 10, but to prevent liquid from entering said tube from said tank. In other respects tube 28 is the same as in the forms of my invention shown in Figs. 1 and 2, that is, it is carried upward and has its upper, open end disposed within conduit 20 above the check valve 22 in the lower end of the latter. In this second alternative form of my invention, gasoline drawn into the conduit 20 is aerated by reason of air drawn through check valve 46, and when suction in said conduit ceases check valves 22, 46 close and the aerated gasoline is discharged through tube 28 and port 48, the valve 50 controlling said port being opened by the weight of the liquid trapped in tube 28. Air bubbles are released beneath bell 26 and these rise into conduit 24 and serve to correct any errors in the hydrostatic balance between the body of gasoline in the tank 10 and the column of liquid in the U-tube gauge as in the other forms of my invention. This last form of invention eliminates any slight variations in the gauge 14 such as might be caused by suction at the lower open end 32 of tube 28 when the latter is arranged as in Figures 1 and 2, and assures also that all of the gasoline entering conduit 20 will be aerated.

From the foregoing it will be observed that in all forms of my invention I provide means to maintain the gasoline within tank 10 at a constant level at the lower open end of conduit 24, which assures an accurate and unfluctuating operation of gauge 14, any errors arising from changes in pressure, temperature, etc., which might tend to change this constant level and thus destroy the hydrostatic balance between the gasoline in the tank and the column of liquid within the U-tube being corrected by air in bubble form periodically entering conduit 24 after operation of the vacuum tank ceases and maintaining the constant level as stated.

Having thus described my invention, what I claim as new and desire to secure by Letters Patent is:

1. In a device of the class described, in combination with a liquid supply tank, an intermittently operating suction device, a conduit connecting said device with the tank whereby liquid is drawn periodically from the latter through said conduit and part of the liquid is allowed periodically to flow back to said tank; a gauge, a conduit connecting the gauge with the tank and terminating within the latter at the minimum depth to be gauged, means for supplying air to the liquid as it is drawn into the first mentioned conduit, and a tube having one end disposed in the first mentioned conduit and opening to receive back flow of liquid in said conduit, said tube having an outlet positioned to discharge entrained air passing through the tube during back flow of liquid into said second mentioned conduit.

2. In a device of the class described, in combination with a liquid supply tank, an intermittently operating suction device, a conduit connecting said device with the tank whereby liquid is drawn periodically from the latter through said conduit and a portion allowed periodically to flow back to said tank; a check valve in said conduit opening in the direction of said suction device, a gauge, a conduit connecting the gauge with the tank and terminating within the latter at the minimum depth to be gauged, means for supplying air to the liquid as it is drawn into said first mentioned conduit, and a tube opening at one end into said first mentioned conduit between said check valve and said suction device and at its other end opening so as to allow a flow therefrom into the lower open end of said second mentioned conduit.

3. In a device of the class described, in combination with a liquid supply tank, an intermittently operating suction device, and a conduit connecting said device with the tank whereby liquid is drawn perodically from the latter and allowed in part periodically to flow back to said tank; a check valve in said conduit opening in the direction of said suction device, a gauge, a conduit connecting the gauge with the tank and terminating within the latter at the minimum depth to be gauged, means for supplying air to the liquid as it is drawn into the first mentioned conduit, and means providing communication between said conduits effective during back-flow of liquid through said first mentioned conduit to transfer entrained air in the back-flowing liquid to said second mentioned conduit, said means communicating with the first mentioned conduit between said check valve and said suction device.

In witness whereof, I have hereunto subscribed my name.

JAMES FENTRESS.